Oct. 11, 1932.  C. L. PUTNEY  1,881,941
AUTOMATIC CLUTCH
Filed Feb. 9, 1932  6 Sheets-Sheet 1

Oct. 11, 1932.     C. L. PUTNEY     1,881,941
AUTOMATIC CLUTCH
Filed Feb. 9, 1932     6 Sheets-Sheet 3

Fig. 6.

Inventor
Charles L. Putney.
By Cameron, Kerkam + Sutton
Attorneys

Patented Oct. 11, 1932

1,881,941

UNITED STATES PATENT OFFICE

CHARLES L. PUTNEY, OF PHILADELPHIA, PENNSYLVANIA, ASSIGNOR TO INVESTORS INDUSTRIES, INC., OF BALTIMORE, MARYLAND, A CORPORATION OF MARYLAND

AUTOMATIC CLUTCH

Application filed February 9, 1932. Serial No. 591,884.

This invention relates to automatic clutches, such as clutches used for connecting a driven to a driving shaft, and more particularly to clutches in which the automatic clutching action is effected through centrifugal force. In such clutches as heretofore constructed the force with which the clutch is applied increases with increase in speed of the driving shaft, and at high speeds this force is very considerable—in fact much more than is essential to effect efficient clutching action. The result of this is that, when it is desired to manually declutch the parts at high speed, an excessive force is required to effect declutching action. Furthermore the wear of the clutch lining necessitates repeated adjustment.

One of the objects of the present invention is to provide an automatic clutch which will be exceedingly simple in construction, highly efficient in operation, and which can be cheaply manufactured. A further object is to provide a clutch of this character so constructed that it can be manually declutched without exercising excessive force, and hence the declutching operation can be effected more readily and more promptly than in clutches heretofore employed. A still further object is to provide a clutch that will largely if not entirely eliminate the necessity of readjustment due to wear. With this and other objects in view which will appear as the description proceeds, the invention consists of a clutch constructed and operating as illustrated in the accompanying drawings, which drawings, however, are for illustration purposes only and are not designed to define the limits of the invention, reference being had to the appended claims for this purpose.

In said drawings—

Figures 1, 2A:
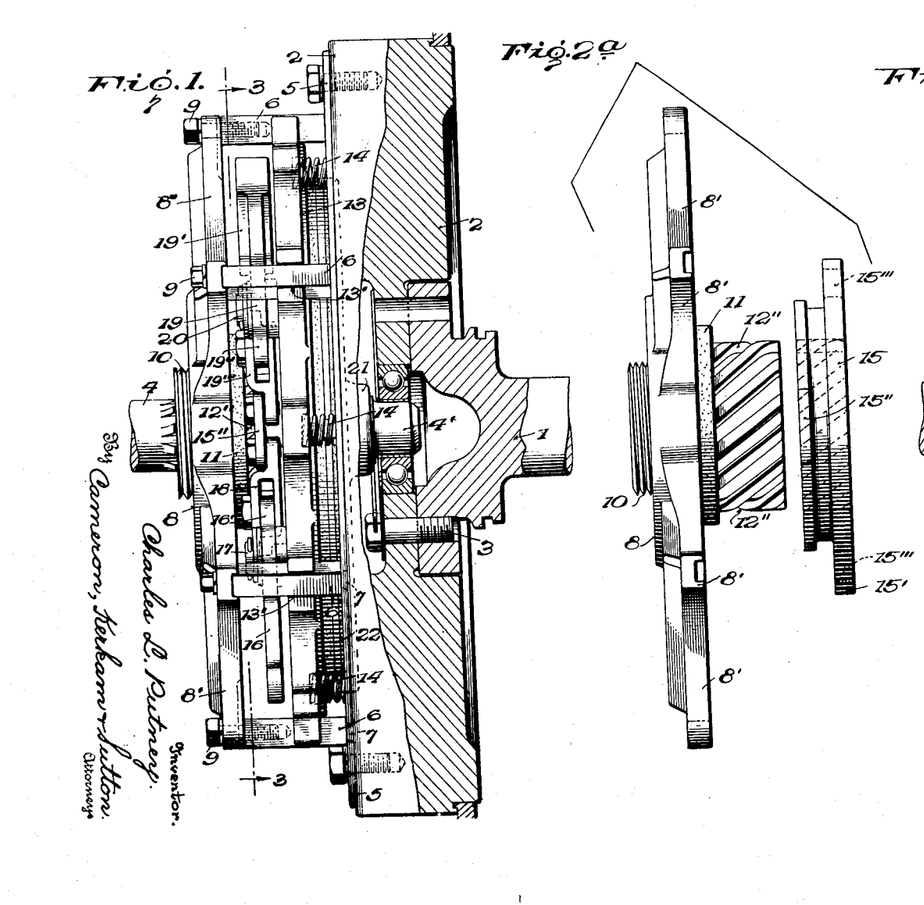
Fig. 1 is a side elevation of one form of the clutch, parts being shown in section.
Fig. 2a is a side elevation of some of the parts shown in Fig. 2.

Referring to the drawings, in which like reference numerals indicate like parts throughout the several views, 1 is a driving element here shown as the rear end of the drive shaft of an automobile. A friction element, as a flywheel 2 is secured to said shaft in any suitable way, as by means of bolts 3, and 4 is a driven element which in the case illustrated takes the form of a shaft, the rear end 4' of which takes bearing in the flywheel, as is common in automobile construction. Bolted or otherwise secured to the rear face of the flywheel 2 is a flat ring 5, and projecting rearward from said ring are a plurality of pins 6—6, here shown as six in number, which pins, as shown, are rectangular in cross section and may be secured to the ring 5 in any suitable manner, as by riveting at 7 (see Fig. 2). The rear end portions of the pins 6 are interiorly screw-threaded, and an annular plate 8, having radially extending spider-like arms 8', is secured to the pins 6 by screw-threaded bolts 9 passing through the exterior ends of the spider-like arms 8', as clearly shown in Figs. 1 and 2. A sleeve 10 (see Figs. 2 and 5), is screw-threaded into the plate 8, and an annular disk 11 of rubber or other suitable sound-deadening material surrounds the sleeve 10, and a second sleeve 12 (see Fig. 5) fits snugly over the sleeve 10, and is keyed thereto in any suitable way as by screws 12′. This sleeve 12 is provided with screw threads 12″ of steep pitch, preferably 45°.

To the rear of the flywheel is an annular disk 13 provided with radial notches or recesses 13′, here shown as six in number, which embrace or receive the pins 6, so that the disk 13 is free to move toward or away from the flywheel, said disk being normally held in its rearward position, that is, away from the flywheel, by springs 14 reacting between the rear face of the flywheel and the forward face of the disk 13. These springs preferably surround a protuberance which projects rearwardly from the face of the flywheel and enter recesses formed in the front face of the disk 13.

It will be observed that the spider plate 8 and the annular disk 13 are secured to and revolve with the flywheel, and hence with the drive shaft, as does also the screw sleeve 12.

Figures 3, 4, 5:
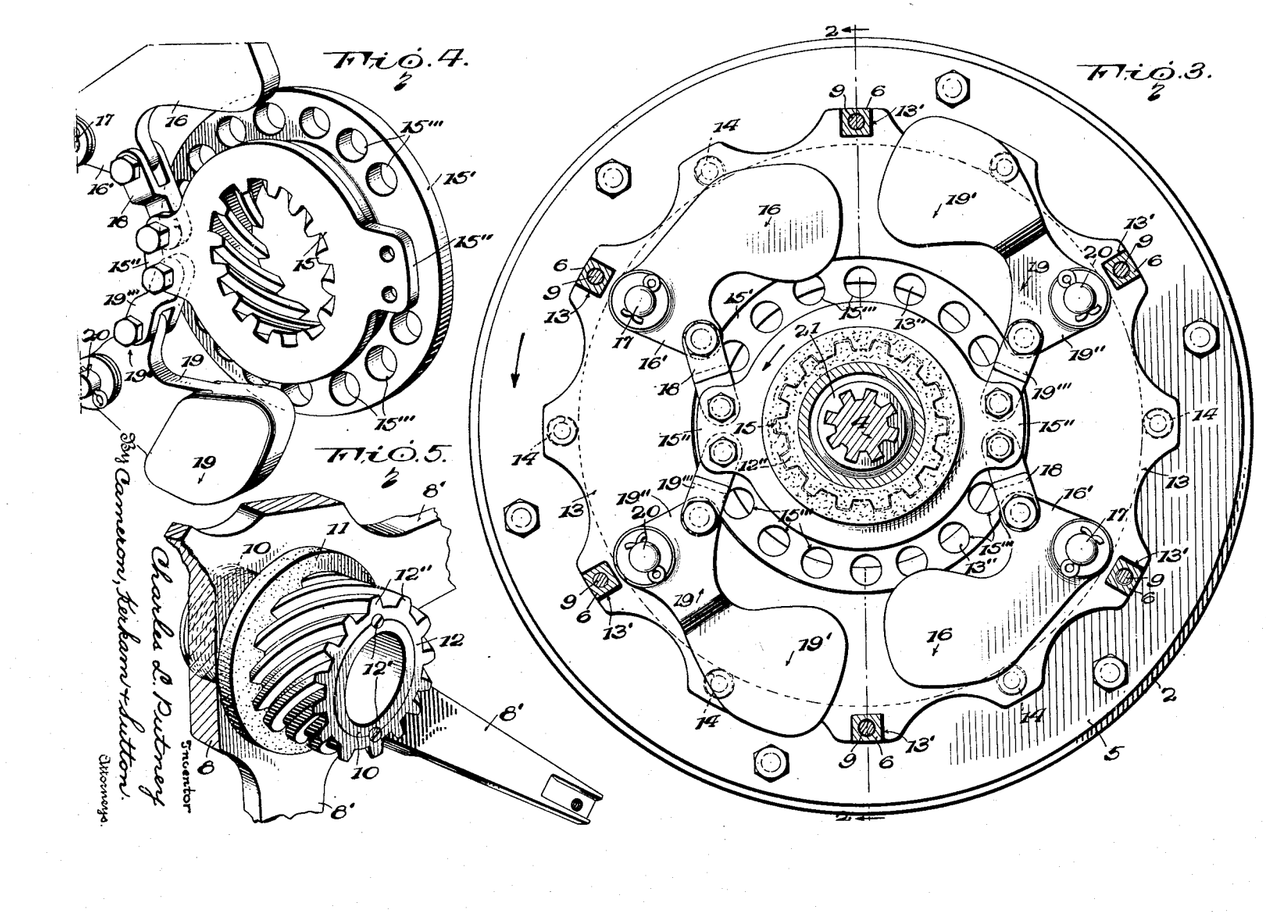
Fig. 3 is a sectional view on the line 3—3 of Fig. 1 looking in the direction of the arrow.
Fig. 4 is a perspective view of a nut and centrifugal weights which operate the same.
Fig. 5 is a perspective view of a screw-threaded part on which the nut of Fig. 4 is mounted, together with a fragmentary showing of parts on which said screw-threaded part is secured.

Referring now to Fig. 4, 15 indicates a nut screw threaded on the sleeve 12, which nut is provided with an annular disk-like shoulder portion 15′, and on diametrically opposite sides thereof with radially projecting ears 15″. The annular portion 15′ is here shown as provided with a series of openings 15‴, which are optionally provided for the purpose of lightening the structure and to permit circulation of air therethrough for cooling purposes. The forward face of the periphery of the annular disk-like shoulder portion 15′ bears against an annular rearwardly facing shoulder 13′ on the rear face of the interior periphery of the annular disk 13. Pivotally mounted on the annular disk 13 are two diametrically opposite bell-crank levers 16, 16, the fulcrums 17, 17 thereof being forward of the main arms of the levers, the parts revolving contra-clockwise as indicated by the arrow in Fig. 3. These levers 16, 16 are each provided with a short arm 16′, which arms are connected by a link 18 one to each of the ears 15″ of the nut 15, the points of connection of the two levers being diametrically opposite each other. Another pair of levers, 19, 19, are similarly fulcrumed on the annular disk 13 at 20, 20, the levers being disposed in front of their respective fulcrums 20. Said levers 19, 19 are materially heavier than the levers 16, 16, said increase in weight being secured by thickening the ends 19′, 19′. Each of the levers 19 has an arm 19″ pivotally connected by a link 19‴ one to each ear 15″ of the nut 15.

Figure 2:
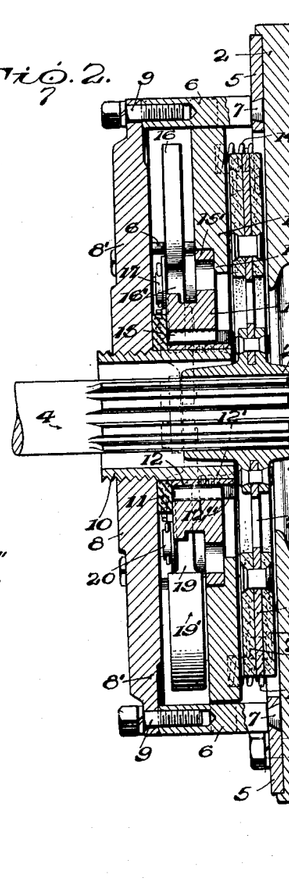
Fig. 2 is a central vertical section of the clutch on the line 2—2 of Fig. 3, parts being shown in the position of rest.

It will be seen that when the drive shaft and the parts connected thereto are revolved contra-clockwise, as indicated by the arrow in Fig. 3, centrifugal action will tend to throw the levers 16 and 19 outward and the actions of the levers 16 and 19 on the nut 15 oppose each other, the levers 16 tending to turn the nut in one direction and the levers 19 tending to turn it in the opposite direction; but by reason of the fact that the levers 19 are heavier than the levers 16, due to the thickened part 19′, the levers 19 operate to turn the nut 15 on the screw sleeve 12 so as to move the nut forward, or to the right as shown in Fig. 2. This movement of the nut 15, by reason of the engagement of the periphery 15′ thereof with the shoulder 13′ of the annular disk 13, forces the disk 13 toward the face of the flywheel 2, or to the right as shown in Fig. 2.

Splined on the driven shaft 4 is a sleeve 21 having radial arms 21′ riveted or otherwise secured thereto as shown in Fig. 2. These radial arms carry an annular clutch disk 22, preferably provided with the usual or any suitable friction surfaces 22′ on the opposite sides thereof, one adjacent to the rear face of the flywheel 2 and the other adjacent to the front face of the disk 13. The parts are so mounted and so proportioned that when at rest the springs 14 hold the disk 13 out of contact with the friction surfaces 22′. The spacing of the friction surfaces 22′ from the rear face of the flywheel and the front face of the disk 13 is such that the disk 13 has to move forward or to the right, as shown in Fig. 2, an appreciable distance before the said friction surfaces are gripped between the disk 13 and the flywheel.

When the drive shaft 1 reaches a predetermined speed, the levers 19 turn the nut 15 on the screw 12 and thereby move said nut and with it the disk 13 forward or to the right, as shown in Fig. 2, and said disk by pressing upon the friction surfaces 22′ moves said surfaces to the right and into contact with the face of the flywheel, thus securing clutching action, with resultant revolution of the driven shaft 4. The splined connection of the sleeve 21 and the driven shaft renders this movement of the friction disk possible.

As the speed of the drive shaft increases, the levers 19, by reason of the fact that they are heavier than the levers 16, continue to press the friction disk 22 into close frictional engagement with the flywheel and the disk 13. As the speed of the drive shaft continues to increase, the effective operation of the levers 16 eventually reaches a point where they approximately equal the effectiveness of the heavier levers 19, and hence no further increase in the pressure or gripping action between the friction disk and the flywheel occurs. This is due to the fact that, as the speed increases, the levers 16, extending to the rear of their fulcrums, increase more rapidly in efficiency than do the levers 19, extending forward of their fulcrums. By proper adjustment of the increased weight portion 19′ of the levers 19, the pressure of the nut 15 on the disk 13 can be fixed at a desired amount, beyond which there will be no substantial increase in the clutching force. The result of this is that the force necessary to declutch need never become excessive, and when such declutching force is manually applied, the operator can easily effect the declutching action regardless of the speed of revolution of the parts.

Figure 6:
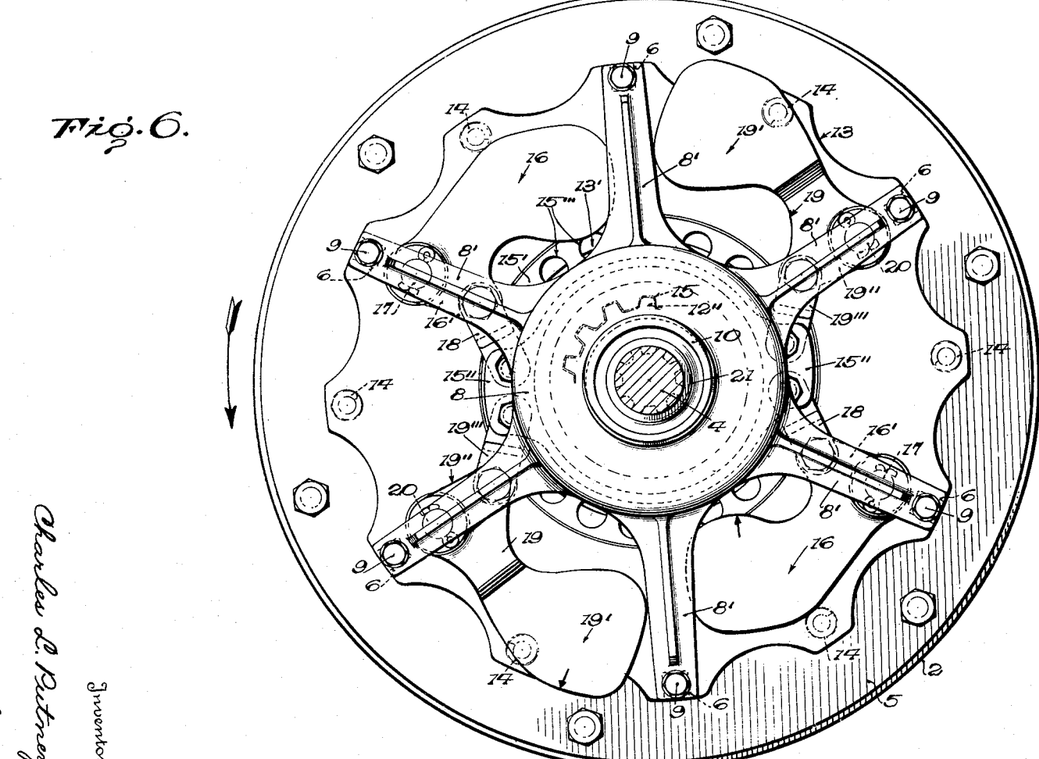
Fig. 6 is a rear elevation of the clutch, with the driven shaft shown in section.

As thus far described, when the parts are at rest the relative positions of the nut 15, the pressure plate 13, the friction disk 14 and the flywheel 2 are as shown in Fig. 2. When the driving shaft 1 is set in motion and reaches a predetermined speed, the levers 19, 19 move outward into the position shown in Figs. 3 and 6. This movement is in opposition to the tendency of the levers 16, 16 to fly outward, and is due to the fact that the levers 19, 19 are of greater weight than the levers 16, 16. As the levers 19, 19 move outward under the influence of centrifugal force, the nut 15 is turned on the screw 12", thus forcing the flange 15' of said nut forward, or from left to right as shown in Fig. 2, against the friction disk 22, and presses the latter disk into frictional engagement with the face of the flywheel. This movement of the nut 15 necessarily forces the levers 16, 16 inward from their normal position, as is clearly illustrated in Figs. 3 and 6. As the speed of the parts increases, the weighted levers 19, 19 tend to increase the pressure exerted by the nut 15 and hold the friction parts of the clutch in engagement with increasing firmness. At the same time, however, as the speed of the parts increases, the opposition offered by the levers 16, 16 to the action of the levers 19, 19 becomes more and more effective, by reason of the fact that said levers 16, 16 are fulcrumed in advance of the center of gravity of the levers while the levers 19, 19 are fulcrumed to the rear of their center of gravity. The result of this is that at some predetermined speed fixed by the relative weights of the levers 16 and 19, the effect of the levers 16, 16 on one hand and levers 19, 19 on the other hand will neutralize each other, and the maximum clutching pressure will be attained at this critical speed.

Furthermore, since the opposition of the levers 16, 16 constantly increases as the speed increases in a greater proportion than do the levers 19, 19, the increase in force with which the frictional members of the clutch are held in engagement does not increase as rapidly as the speed of the parts increases.

The result is that by properly proportioning the respective weights of the levers 16, 16 and levers 19, 19 the maximum frictional engagement of the parts can be predetermined, and the force necessary to declutch the parts can also be predetermined. In fact the force necessary to declutch the parts can be approximately the same at all speeds. There will, of course, be a slight increase in the increase of speed up to the critical point, but this variation will be so slight as to be negligible. This is important, because it insures that at no time will it be necessary to exercise abnormal force to effect the manual declutching of the parts.

As thus far described declutching action can be secured by decreasing the speed of the driving shaft to approximately idling speed, as for example, by removing the foot from the accelerator in an automobile.

Figure 7:
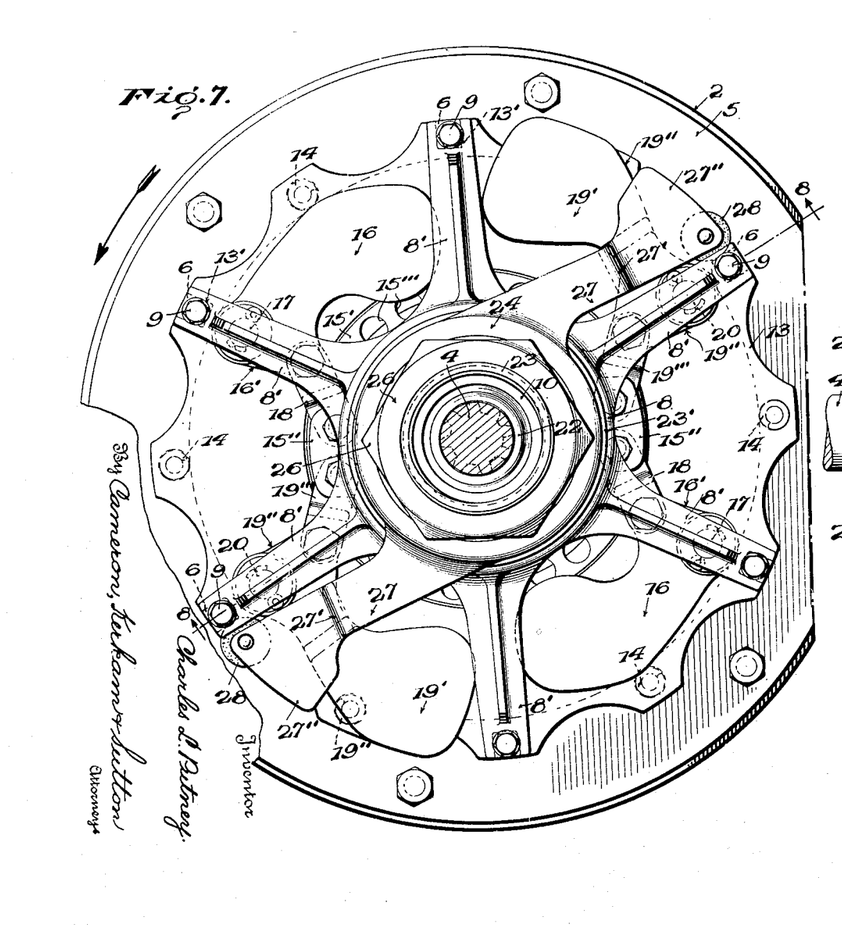
Fig. 7 is a rear elevation of the clutch showing an automatic declutching mechanism applied thereto, the parts being shown in running position.
Figure 8:
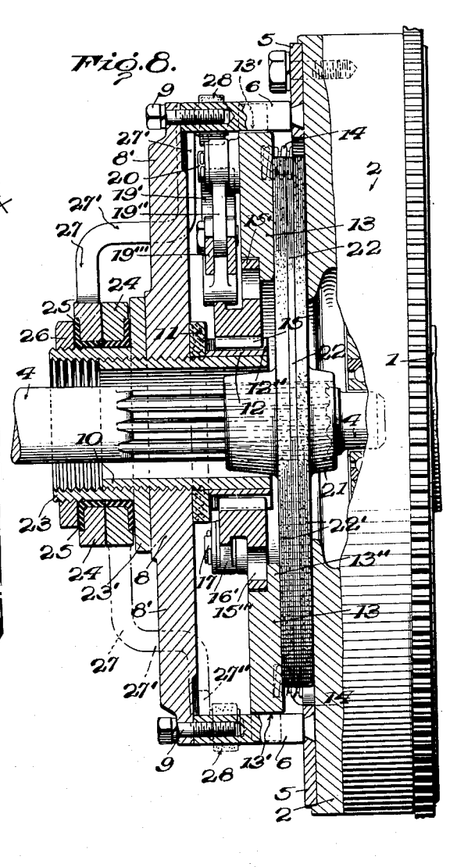
Fig. 8 is a sectional view on the line 8—8 of Fig. 7, parts being shown in elevation.

In some cases it may be desirable to provide automatic declutching mechanism, and one form of such mechanism is illustrated in Figs. 7 and 8. In Fig. 8 the sleeve 10 is shown extended somewhat to the rear of the plate 8. Screw threaded on the exterior of the sleeve 10 is a rearwardly projecting sleeve 23, and mounted to turn freely on the sleeve 23 are two hubs 24 preferably provided with a hard metal bearing surface 25, said hubs 24 being held in position between the flange 23' of the sleeve 23 and the nut 26, screw threaded on the sleeve 23. Projecting tangentially from the hubs 24 are outwardly extending arms 27 having a part 27' extending forward and then again bent outward. On the outer ends of these arms are borne rollers 28 of hard rubber or other suitable material, the radial distance of said rollers from the axis of the shaft 4 being less than the radial distance of the outermost line of the levers 19, 19 when the same are swung outward under centrifugal action. Preferably the extreme outer ends of the arms 27, 27' are weighted by forwardly extending portions 27".

When the parts are in operation and the clutch is revolving in the direction indicated by the arrow in Fig. 7, the arms 27 and with them the rollers 28, by reason of their inertia and loose mounting on the sleeve 23, swing backward or in a clockwise direction until said rollers contact with the pins 6, but when the speed of the driving shaft, and with it the sleeve 23 is decreased, the arms 27, together with the rollers 28 move contra-clockwise by reason of their inertia, and contact with the periphery 19" of the levers 19, 19 and force said levers inward, thereby turning the nut 15 on the screw 12" so as to withdraw said nut to the left, as shown in Fig. 8, whereupon the springs 14 force the pressure plate 13 to the left and release the clutch. Any increase in the speed of the driving shaft 1 thereafter will restore the arms 27 and the rollers 28 to the position shown in Fig. 7, that is, with the rollers 28 bearing against the pins 6, thus leaving the levers 19 free to move outward under centrifugal action to again apply the clutch.

It will thus be seen that declutching action can be automatically secured by merely lifting the foot from the accelerator, and the machine, in the case of an automobile, will automatically go into free wheeling.

Figure 9:
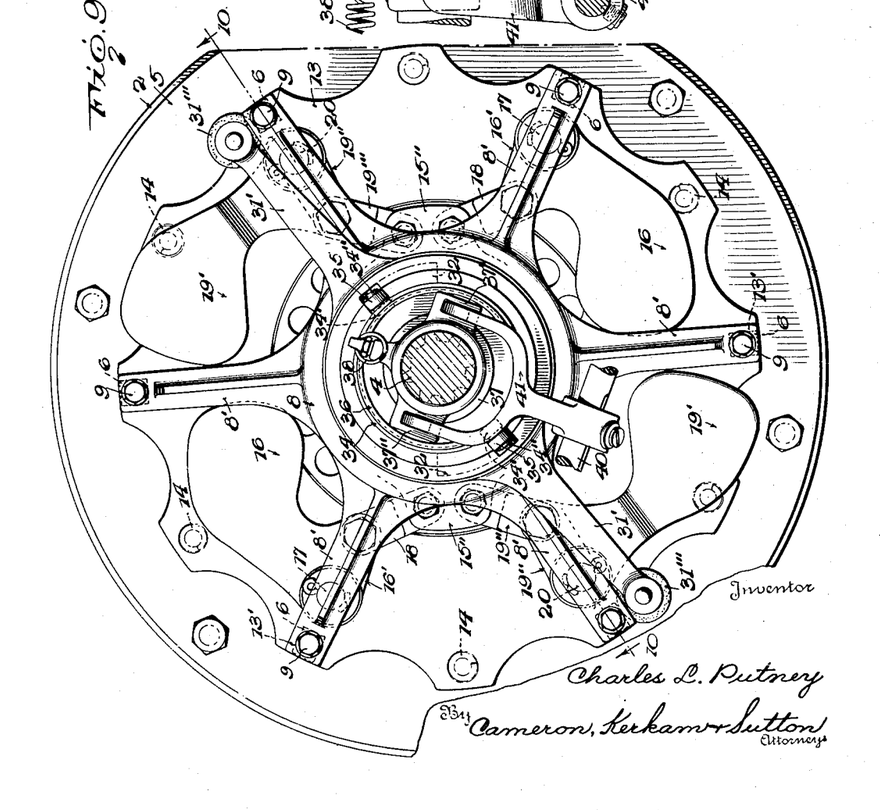
Fig. 9 is a view similar to Fig. 7 showing manually operated means for actuating the declutching mechanism.
Figure 10:
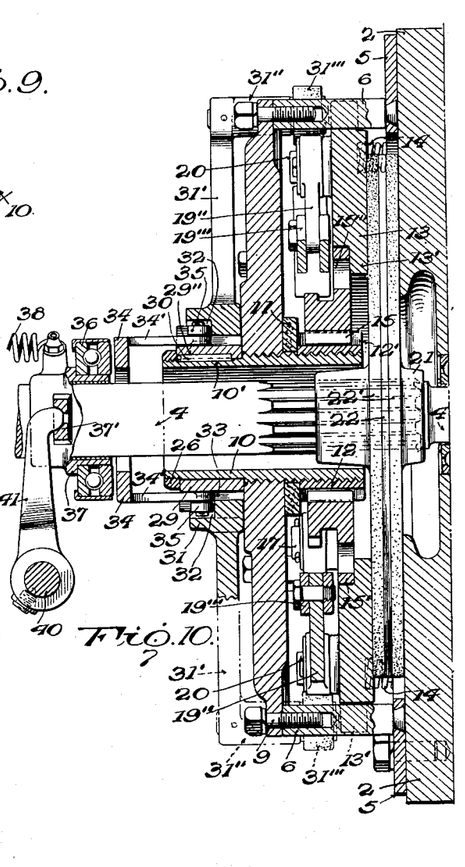
Fig. 10 is a sectional view on the line 10—10 of Fig. 9.
Figure 11:
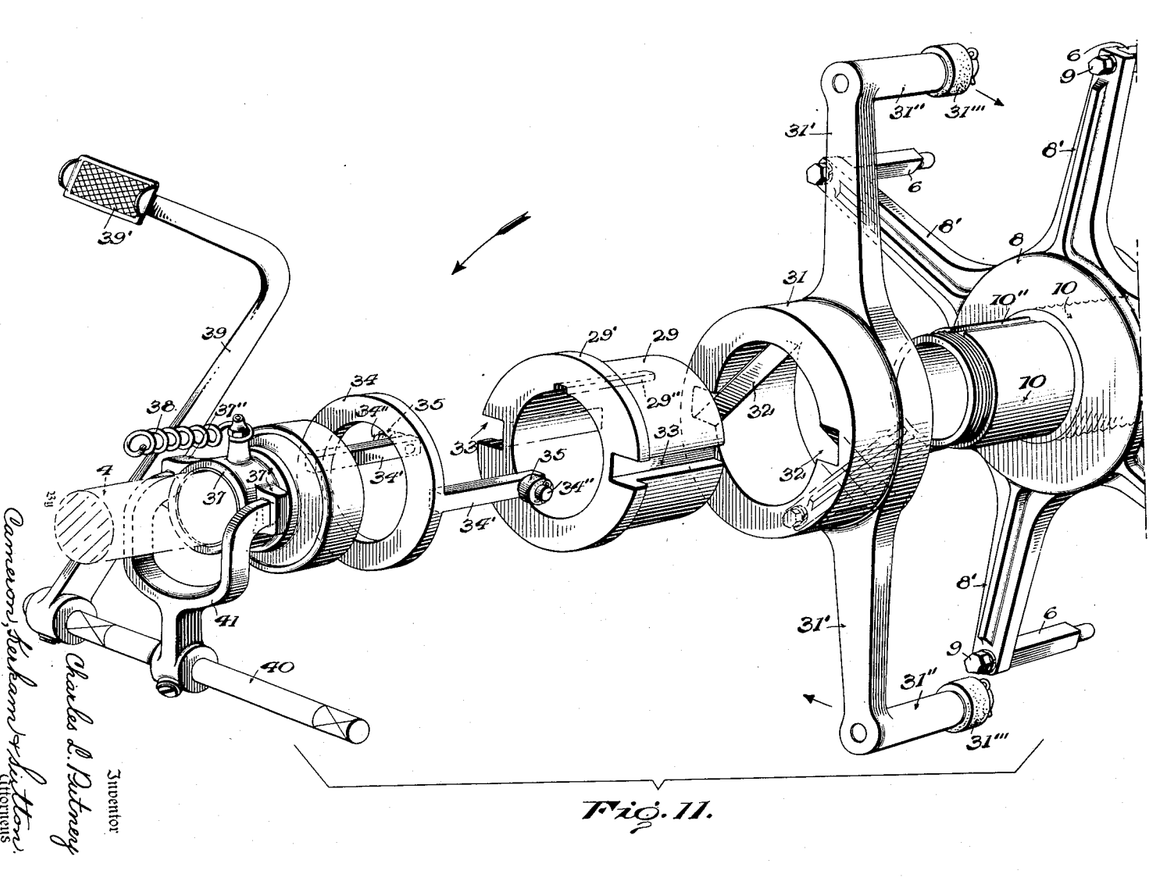
Fig. 11 is an expanded perspective view illustrating the declutching mechanism.

In case it is desired to provide means for manually declutching, the construction shown in Figs. 9, 10 and 11 is preferably employed.

Referring to Fig. 11, the sleeve 10 projecting rearward through the plate 8 has formed thereon a rearwardly extending portion 10' screw threaded at its rear end and provided with a keyway 10''. Surrounding the reduced sleeve portion 10' is a sleeve 29 having a rear flange 29' and provided with a keyway 29'' which registers with the keyway 10'' of the sleeve 10', and the two sleeves 29 and 10' are keyed together with a key 30 (see Fig. 10) entering the keyways 10'' and 29''. Between the flange 29' on the sleeve 29 and the rear face of the plate 8 is mounted a hub 31 having two diametrically extending arms 31', said arms being connected to the hub 31 adjacent the plate 8. The hub 31 extends some distance rearwardly of the arms 31' and has formed on the interior wall of the hub two cam slots 32. The sleeve 29 has formed in its exterior wall two longitudinally extending slots 33 which are parallel with the axis of the sleeve 29. Surrounding the shaft 4, and preferably out of contact therewith, as a ring or annular disk 34 having two forwardly extending arms 34' and on the forward end of said arms are outwardly extending stub shafts 34'' on which are mounted rollers 35. The arms 34' enter the slots 33 on the sleeve 29 while the rollers 35 project radially outward from said slots and register respectively with the cam slots 32 in the hub 31.

At the extreme outer end of the arms 31' are provided forwardly (that is to the right in Figs. 10 and 11) extending portions 31'', and on the forward end of these portions 31'' are mounted rollers 31''', the parts being so proportioned that said rollers bear against two of the pins 6 when the arms 31' are in their extreme rearward position, that is the right hand position as shown in Fig. 9.

Upon any forward motion being imparted to the ring 34, the arms 34' act as keys to prevent said ring from revolving with relation to the sleeve 29 and the rollers 35 enter the cam slots 32 in the hub 31 and turn the hub contra-clockwise, or from right to left as shown in Figs. 9 and 11, and as this turning movement progresses the rollers 31''' contact with the levers 19, 19 and force the same inward or towards the shaft 4, thereby moving the nut 15 to the left as shown in Fig. 10, and relieve the pressure of said nut upon the pressure plate 13, whereupon the springs 14 move said pressure disk to the left as seen in Fig. 10, declutching the parts. The ring 34 is moved forward, or from left to right, as seen in Fig. 10 by means of an annular shoulder 36 (here shown in the form of an anti-friction ring) mounted on a sleeve 37 slidable on the shaft 4. This sleeve 37 is held in its rearward position (or left-hand position as shown in Figs. 10 and 11) by a spring 38 suitably secured to the sleeve at one end and any fixed part of the mechanism at the other end. A lever 39 (Fig. 11) is keyed to a shaft 40, which shaft has a forked lever 41 whose two arms bear against two oppositely disposed lugs 37' on the sleeve 37. When the lever 39 is pushed forward, (from left to right as shown in Fig. 11) as by pressure upon the pedal 39', the sleeve 37 moves the shoulder 36 forward, thus forcing the ring 34 and with it the rollers 35 forward, turning the hub 31 and with it the rollers 31''' contra-clockwise, (from right to left as shown in the drawings) whereby the rollers 35'' bear upon the levers 19 and force them inward to produce the declutching action, above referred to.

It will thus be seen that there is provided a clutch in which the declutching action may be secured (1) by decreased acceleration, the levers 19 moving automatically into declutching position; or (2) by forcing the levers 19 inward by the automatic operation of the arms 27 bearing the rollers 28; or (3) by manually moving the arms inward by operation of the foot pedal 39'.

While for the purpose of illustrating the invention one specific form of manually operated declutching mechanism is shown, it will be understood that any suitable mechanism for relieving the pressure disk 13 from the pressure of the nut 15 may be employed without departing from the spirit of the invention.

One of the important features of the invention resides in the fact that declutching action may be secured manually by exercising approximately the same declutching force regardless of the speed of the driving shaft within ordinary operating conditions. While there may be, and doubtless is, some slight variation up to the critical speed, nevertheless the force necessary to actuate the declutching lever 39 is approximately the same at all times up to the critical speed for which the parts are adjusted, and any increase in speed beyond this will not produce any material increase in the clutching pressure. It will further be observed that by reason of the manner in which the levers 16—16 and 19—19 are mounted and connected, the levers, operating as they do, through a single axial nut exert a uniform force on the pressure disk at all points around the periphery of said disk, with the result that the frictional engagement of the friction surface 22' is uniform around its entire periphery, so that the wear on this friction surface is uniform. This avoids a difficulty heretofore experienced with clutches, to wit, the uneven wearing of the friction surfaces and the consequent slipping and sudden gripping of the clutch, with consequent increased wear necessitating a new adjustment of the parts. Furthermore, it will be observed that all of the parts of the clutch except the friction disk 22 are mounted upon and revolve with the drive shaft, the friction disk 22 being the only part that is carried by the driven shaft. Still further it will be noted that the clutch is one of extremely simple construction, very compact and composed of but few and sturdy parts.

While for the purpose of describing the invention, the same has been set forth in specific detail, it will be understood that such detailed construction is merely for the purpose of enabling the inventive idea to be readily understood and that many variations in such specific construction may be made without departing from the spirit of the invention as defined in the appended claims, and all such variations as come within the terms of said claims are intended to be and do form a part of the invention.

Having thus described the invention, what is claimed is:

1. In a clutch mechanism, the combination of a driving shaft and a driven shaft coaxial therewith, a flywheel on the driving shaft, a friction disk coaxial with the driven shaft and movable longitudinally thereof, a pressure disk coaxial with the driven shaft and mounted on the flywheel to move toward and from the friction disk, a screw mounted on the flywheel and coaxial with the driven shaft and a nut engaging said screw and bearing upon said pressure disk, and centrifugally actuated means carried by the flywheel for turning said nut on said screw, whereby upon operation of the driving shaft said nut automatically brings the pressure plate, friction disk and flywheel into clutching engagement.

2. In a clutch mechanism, the combination of a driving shaft and a driven shaft coaxial therewith, a flywheel on the driving shaft, a friction disk coaxial with the driven shaft and movable longitudinally thereof, a pressure disk coaxial with the driven shaft and mounted on the flywheel to move toward and from the friction disk, a screw mounted on the flywheel and coaxial with the driven shaft, a nut on said screw and bearing on said pressure disk, and manually operated means for releasing said pressure disk from the pressure of said nut in opposition to centrifugal force when the parts are in motion.

3. In a clutch mechanism, the combination of a driving shaft and a driven shaft coaxial therewith, a flywheel mounted on the driving shaft, a pressure disk coaxial with the driven shaft and slidably mounted on the flywheel, a friction disk slidably mounted on the driven shaft between the pressure disk and the flywheel, resilient means normally holding the pressure disk out of contact with the friction disk, a screw and nut mounted on the flywheel coaxial with the driven shaft with said nut bearing upon the pressure disk, and centrifugally operated means carried by the flywheel and operatively connected to said nut whereby the nut forces the pressure disk into contact with the friction disk when the driving shaft reaches a predetermined speed.

4. In a clutch mechanism, the combination of a driving shaft and a driven shaft coaxial therewith, a flywheel mounted on the driving shaft, a pressure disk coaxial with the driven shaft and mounted on the flywheel to move toward and from said flywheel, resilient means reacting between the flywheel and pressure disk, a friction disk slidably mounted on the driven shaft coaxial therewith and between the flywheel and pressure disk, a screw and nut mounted on the flywheel and coaxial with the driven shaft, the said nut bearing on the pressure disk, a pair of differentially weighted levers carried by the flywheel and fulcrumed between the periphery of said nut and the periphery of the flywheel, one arm of each of said levers being connected to said nut, one of said levers having its fulcrum in advance of the heavy arm of the lever, and the other having its fulcrum at the rear of the heavy arm of said lever, whereby under the influence of centrifugal force said levers act upon said nut in opposition to each other.

5. In a clutch mechanism, the combination of a driving shaft and a driven shaft coaxial therewith, a flywheel mounted on the driving shaft, a pressure disk coaxial with the driven shaft and carried by the flywheel, a friction disk coaxial with the driven shaft and slidably mounted thereon between the pressure disk and the flywheel, a screw and nut coaxial with the driven shaft and carried by the flywheel with said nut bearing on the pressure disk, resilient means reacting between the flywheel and said pressure disk, a plurality of centrifugally actuated weighted levers whose fulcrums are carried by the flywheel, one arm of each of said levers being connected to said nut, and some of said levers having the free arm weighted in excess of the free arm of the other levers, the heavier weighted levers having their free arms positioned in front of the lever fulcrums and the lighter weighted levers having their free arms positioned to the rear of their fulcrums, whereby said nut forces said pressure disk against the friction disk under the influence of the heavier levers and in opposition to the action of the lighter levers.

6. In a clutch mechanism, the combination of a driving shaft, a clutch element thereon, a driven shaft, a clutch element thereon and movable toward and from the element on the driving shaft, a pressure disk carried by the driving shaft and movable toward and from said element on the driven shaft, a screw and nut coaxial with the driven shafts and carried by the driving shaft, said nut bearing upon said pressure disk, and centrifugally actuated means carried by the driving shaft and imparting relative axial movement between said screw and nut.

7. In a clutch mechanism, the combination of a driving member and a driven member coaxial therewith, with a friction element on the driving member, a friction element on the driven member and movable thereon, a pressure disk mounted on the driving member to move toward and from the friction element on the driven member, a screw mounted on the driving member and coaxial with the driven member, a nut on said screw and bearing on said pressure disk, and centrifugally actuated means carried by the driving member turning said nut on the screw.

8. In a clutch mechanism, the combination of a driving and a driven shaft, centrifugally actuated means automatically forcing said parts into clutching engagement, and an inertia controlled device moving said centrifugally actuated means to declutch the parts.

9. In a clutch mechanism, the combination of a driving and a driven shaft each carrying a clutch member, centrifugally actuated means automatically forcing said members into clutching engagement, and an inertia controlled device for moving said centrifugally actuated means to declutch the parts.

10. In a clutch mechanism, the combination of a driving and a driven shaft each carrying a clutch member, centrifugally actuated means automatically forcing said members into clutching engagement, and an arm carried by the driving shaft and mounted to have free turning movement thereon and acting under inertia to shift said centrifugally actuated means into declutching position.

11. In a clutch mechanism, the combination of a driving and a driven shaft each bearing a clutch member, a centrifugally actuated lever for automatically forcing said members into clutching engagement, and means acting automatically under inertia to automatically shift said lever into declutching position.

12. In a clutch mechanism, the combination of a driving and a driven part, a centrifugally actuated lever automatically forcing said parts into clutching engagement, and means acting under the influence of inertia to move said centrifugally actuated lever in opposition to centrifugal force, whereby the parts are shifted to declutching position.

13. In a clutch mechanism, the combination of a driving and a driven shaft each carrying a clutch member, a nut and screw coaxial with said shafts, a pair of centrifugally actuated levers carried by the driving shaft and each connected to said nut member whereby said nut is moved under centrifugal action to force said clutch members into clutching engagement, and a second pair of centrifugally actuated levers each connected to said nut and acting in opposition to said first mentioned centrifugal levers.

14. In a clutch mechanism, the combination of a driving shaft and a driven shaft each bearing a clutch member, one of said clutch members being shiftable to secure clutching and declutching engagement between said members, a screw and nut carried by the driving shaft and coaxial therewith, a pair of weighted levers carried by the driving shaft and operatively connected to said nut to shift the same coaxially of said shaft whereby said clutch members are forced into clutching engagement, and a pair of lighter levers connected to said nut, and acting under the influence of centrifugal force in opposition to said weighted levers.

15. In a clutch mechanism, the combination of a driving and a driven shaft each bearing a clutch member one of which is movable with relation to the other, a nut and screw carried by the driving shaft and coaxial therewith, a pair of weighted levers carried by the driving shaft with their fulcrums to the rear of the weighted portions of said levers when the parts are in motion, connections between said weighted levers and said nut whereby the nut is shifted coaxially with the driving shaft to bring said clutch members into clutching engagement, and a pair of centrifugally actuated levers carried by said driving shaft with their fulcrums forward of the main body of said levers, and connections between said lighter levers and said nut, whereby said lighter levers under centrifugal action offer increasing opposition to said weighted levers as the speed of the parts increases.

16. In a clutch mechanism, the combination of a driving and a driven shaft each bearing a clutch member one of which is movable with relation to the other, a nut and screw carried by the driving shaft and coaxial therewith, a pair of weighted levers carried by the driving shaft with their fulcrums to the rear of the weighted portions of said levers when the parts are in motion, connections between said weighted levers and said nut whereby the nut is shifted coaxially with the driving shaft to bring said clutch members into clutching engagement, and means loosely mounted coaxially with said driving shaft to turn on the same, whereby said means by reason of inertia is free to have axial movement on the shaft, a stop carried by the shaft limiting the movement of said means in one direction but permitting free movement thereof in the other direction, and a part carried by said means for automatically shifting said weighted levers against the action of centrifugal force upon a decrease in speed of the driving shaft.

17. In a clutch mechanism, the combination of a driving and a driven part, centrifugally actuated means automatically forcing said parts into clutching engagement, an inertia member loosely mounted coaxially with said driving and driven parts, and manually operated means for shifting said inertia member to force said centrifugally actuated means into declutching position.

18. In a clutch mechanism, the combination of a driving and a driven shaft each bearing a clutch member coaxial therewith and one of said members shiftable axially, means normally holding said members in declutching position, a centrifugally actuated lever shifting said members into clutching engagement at a predetermined speed, a lever arm loosely carried by the driving shaft to turn freely thereon and normally held out of the path of said centrifugally actuated lever by inertia upon revolution of the driving shaft, and manually operated means for shifting said inertia controlled lever to force said centrifugally actuated lever into declutching position.

19. In a clutch mechanism, the combination of a driving shaft and a driven shaft coaxial therewith, a clutch member carried by the driving shaft, a clutch member carried by the driven shaft and shiftable longitudinally thereon, yielding means normally holding said clutch members out of engagement, a pressure plate carried by the driving shaft and shiftable longitudinally thereon to force said clutch members into clutching engagement, a nut and screw carried by the driving shaft, said nut bearing against said pressure plate, a pair of oppositely disposed centrifugally actuated weighted levers carried on the driving shaft and operatively connected to said nut whereby said nut is forced against said pressure plate, and a pair of lighter centrifugally actuated levers carried by the driving shaft and connected to said nut to act in opposition to said weighted levers.

20. In a clutch mechanism, the combination of a driving shaft and a driven shaft coaxial therewith, a clutch member carried by the driven shaft and shiftable longitudinally thereon, yielding means normally holding said clutch members out of engagement, a pressure plate carried by the driving shaft and shiftable longitudinally thereon to force said clutch members into clutching engagement, a nut and screw carried by the driving shaft, said nut bearing against said pressure plate, a pair of oppositely disposed centrifugally actuated weighted levers carried on the driving shaft with their fulcrums to the rear of their center of gravity and connected to said nut whereby said nut is shifted axially on the driving shaft to move said pressure plate, a pair of lighter levers with their fulcrums in front of their center of gravity, and connections between said lighter levers and said nut whereby under centrifugal action said lighter levers offer constantly increasing opposition to said weighted levers.

In testimony whereof I have signed this specification.

CHARLES L. PUTNEY.